UNITED STATES PATENT OFFICE.

EDUIN O. G. WINCKLER, OF NEW YORK, N. Y.

COMPOSITION OF MATTER TO BE USED IN MAKING COPYING-PADS.

No. 904,590.  Specification of Letters Patent.  Patented Nov. 24, 1908.

Application filed February 24, 1908. Serial No. 417,577.

*To all whom it may concern:*

Be it known that I, EDUIN O. G. WINCKLER, formerly a subject of the Emperor of Germany, now in possession of the first paper for citizenship of the United States, residing at 7 Willow street, New York city, borough of Brooklyn, Kings county, State of New York, have invented a new and useful Composition of Matter to be Used for Making Copying-Pads, (Hectographs,) of which the following is a specification.

My composition consists of the following ingredients combined in the proportions viz:

| | | |
|---|---|---|
| Water substantially pure | 375 | parts |
| Gelatin | 100 | " |
| Glycerin | 375 | " |
| Heavy spar | 50 | " |
| Willow charcoal powdered | 2 | " |

A solution of
50 parts of muriatic acid.
50 "    " water.

A small quantity of animal or vegetable color.

To make this composition I first dissolve the gelatin in the water by means of a hot water bath, after the gelatin is dissolved entirely I add the glycerin continuing heating and stirring constantly, then I add the heavy spar and the willow charcoal. To avoid the dirty gray coloration, which the charcoal will give to the composition I mix a small quantity of any suitable vegetable or animal color (yellow) to the charcoal before adding it to the composition.

After the composition is mixed thoroughly I pour it while hot in a shallow pan of any material not subject to oxidation letting it cool down for an hour or two according to the temperature. Meanwhile I prepare a solution of 50 parts of water (substantially pure) and 50 parts of muriatic acid and apply three coats of this solution to the surface of the composition, letting each coating dry before applying the next one. After 5–6 hours rest the composition is ready for use.

The use is the same as of the hectographs in use now, first I wet the surface with a damped sponge and allow it to stand a couple minutes, I then transfer the original, written with a hectographic ink made of animal or vegetable colors, and let it remain on the surface for not more than 2 minutes and remove it. Sixty to 80 copies can be taken. After use no washing is required, a rest of 12 hours will destroy the color of the writing rendering the pad ready for use again, previous writings in no way interfering with the efficiency of the composition.

The purpose of adding "heavy spar" to the composition is: 1. To prepare the composition for the effect of the muriatic acid solution. 2: To prevent the composition from hardening after the water is evaporated.

The purpose of adding "willow charcoal" is: 1: To aid the dissolution of the "heavy spar." 2: To prevent the evaporation of the muriatic acid.

The composition requires no "washing off" because the solution of muriatic acid applied to by means of the coating process as described will destroy the capacity of the ink to dye.

I am aware that a composition consisting of water, gelatin, glycerin and heavy spar has been used for the purpose of making copying pads, a pad made of a composition consisting of these ingredients only requires a washing off of the writing, which damages the composition, making its surface uneven. I am also aware that muriatic acid added to water is used to make this washing off easier and less damageable, but I am not aware that all the ingredients of my composition and the coating of it has been used together.

I claim:

1. The herein described composition of matter consisting of: Water, gelatin, glycerin, heavy spar, willow charcoal, a solution of water and muriatic acid substantially as described and for the purpose specified.

2. The herein described composition of matter for making "copying pads" (hectographs) consisting of:

| | | |
|---|---|---|
| Water substantially pure | 375 | parts |
| Gelatin | 100 | " |
| Glycerin | 375 | " |
| Heavy spar | 50 | " |
| Willow charcoal powdered | 2 | " |

A solution of
50 parts of muriatic acid
50 "    " water substantially as described.

EDUIN O. G. WINCKLER.

Witnesses:
JOSEPH MORGENSTER,
JAMES A. HAER.